United States Patent [19]

Houser et al.

[11] 4,300,412
[45] Nov. 17, 1981

[54] APPARATUS FOR LOOSENING VEHICLE WHEEL LUGS

[76] Inventors: William Houser, 751 Stony Hill Rd., Yardley, R.D. 1, Woodside, Pa. 19067; John Muntzer, 681 Arbor La., Warminster, Pa. 18974

[21] Appl. No.: 182,448

[22] Filed: Aug. 29, 1980

[51] Int. Cl.³ ............................................. B25B 13/00
[52] U.S. Cl. ................................. 81/53 R; 81/180 R
[58] Field of Search ..................... 81/53 R, 54, 180 R, 81/184, 58.1

[56] References Cited

U.S. PATENT DOCUMENTS 2,267,012 12/1941 Bowne ................................. 81/53 R
2,447,919 8/1948 Teigen .............................. 81/180 R
3,069,945 12/1962 Shandel .............................. 81/53 R Primary Examiner—James L. Jones, Jr.
Attorney, Agent, or Firm—Arthur L. Plevy

[57] ABSTRACT

A support apparatus for removing lugs from a vehicle wheel comprises a U shaped base member having a central rod rotatably coupled between the upstanding arms of the U via coaxial apertures in each arm. A T shaped section is located between the upstanding arms and is rigidly secured to the rod. A large lever arm is selectively inserted into the T shaped section to enable a user to develop a large torque while resting his foot and hence, applying his full body weight to the base of the U shaped member which is resting upon the ground when a force is exerted upon the upstanding lever arm. Once the lug is turned, the lever arm may be removed and the user has access to the rotatable rod to further rotate the lug so that it may be completely removed from the wheel.

10 Claims, 4 Drawing Figures

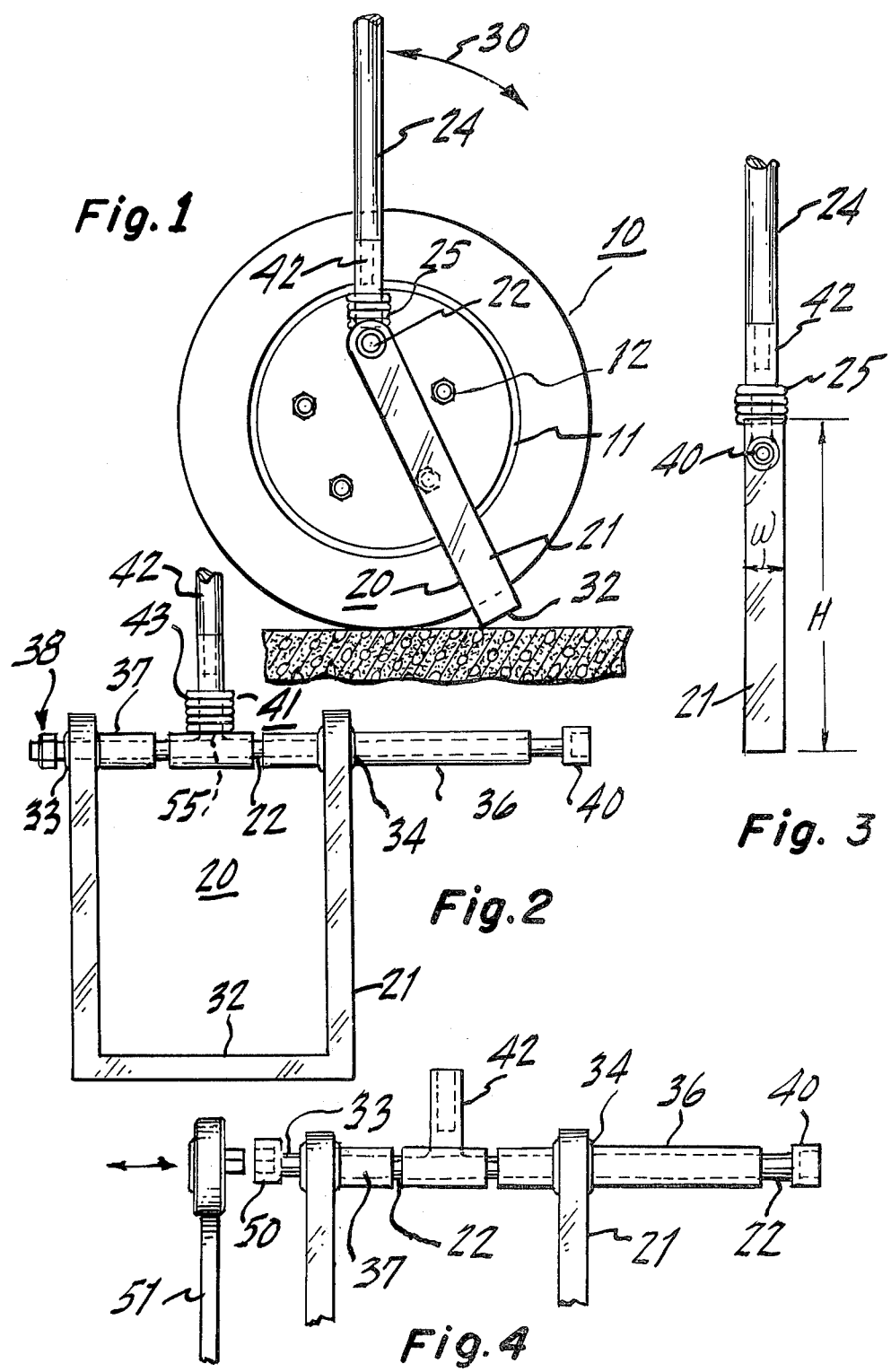

APPARATUS FOR LOOSENING VEHICLE WHEEL LUGS

BACKGROUND OF THE INVENTION

This invention relates to apparatus for loosening of wheel nuts or lugs on a vehicle wheel and more particularly to an adjustable support apparatus capable of providing a great deal of torque to facilitate the removal of a wheel lug or nut from an automobile or other vehicle.

Anyone who has ever repaired a flat tire or removed a tire from an automobile knows the difficulty in imparting a sufficient force by using a conventional lug wrench to "break" or rotate a wheel lug. The problem even becomes more difficult for those persons who are physically weaker than average individuals, such as females and so on.

As is known, a conventional lug wrench used to loosen wheel nuts is of an L shaped configuration having a handle portion of a sufficient length to provide a mechanical advantage to enable a user to develop a fairly large torque with a given imparted force. In these devices, great care has to be taken so as to not twist or pull the wrench so that it disengages from the lug and hence, may cause injury to the vehicle or to the user.

The prior art is cognizant of such problems and hence, there are a plurality of patents which attempt to obviate the problems by providing support devices which serve to increase the mechanical advantage and tend to provide greater stability to the apparatus, as will be explained. many such devices are not amenable to be used with automobiles as they cannot be easily stored in the trunk of the vehicle due to their size and construction. Other devices are extremely difficult to manufacture as they are relatively complicated and hence, present difficulties both in construction and in use. It is, of course, understood that many such devices relate to the removal of wheel lugs or nuts from all types of vehicles, including trucks and so on.

Typical of such prior art techniques is the apparatus depicted in U.S. Pat. No. 2,447,919 entitled ADJUSTABLE SUPPORT issued on Aug. 24, 1948 to A. F. Teigen. This patent discloses a wrench shank which is secured to a slide, which slide is mounted on a support stand for vertical movement. The patent discloses a clamping structure which will clamp the mechanisms to a tubular base member.

U.S. Pat. No. 2,960,895 issued on Nov. 22, 1960 entitled WRENCH SUPPORT by G. Richards depicts a relatively complicated mechanism which is adjustable and includes a wheel base arrangement having three transverse arms and is particularly adapted for use in a terminal facility such as a garage and so on.

U.S. Pat. No. 3,097,550 entitled LUG WRENCH SUPPORT by H. H. Johnston issued on July 16, 1963 depicarrangement having three transverse arms and is particularly adapted for use in a terminal facility such as a garage and so on.

U.S. Pat. No. 3,097,550 entitled LUG WRENCH SUPPORT by H. H. Johnston issued on July 16, 1963 depicts a jack type assembly which is vertically adjusted to permit an outer supported end of a lug wrench to be elevated and adjusted.

Other patents such as U.S. Pat. No. 3,730,027 entitled ADJUSTABLE TRUCK WRENCH SUPPORT issued on May 1, 1973 to D. M. Rohn depicts a jack like stand for supporting the shaft of a lug wrench, which apparatus includes a pair of telescoping tubular members mounted on a foldable base assembly.

U.S. Pat. No. 3,832,917 entitled A DEVICE FOR LOOSENING WHEEL NUTS OR LUGS OF AUTOMOBILE WHEELS issued on Sept. 3, 1974 to F. Feith depicts an upstanding rod like member with a support base having a slidable collar, which collar can be vertically positioned by means of a thumb screw adjustment.

As one will ascertain by a perusal of the above noted patents, such devices are relatively complicated, difficult to operate and adjust, and many are not suitable for containment within the trunk of a vehicle, as they are large and cumbersome to operate, use and store.

It is an object of the present invention to provide an improved apparatus particularly adapted to loosen wheel lugs, while providing a simple and economical configuration capable of affording a large mechanical advantage to thereby enable a physically weak individual to remove a lug or nut in an extremely reliable and efficient manner.

BRIEF DESCRIPTION OF THE PREFERRED EMBODIMENT

Apparatus for loosening and removing vehicle wheel lugs comprises a U shaped base member having a first aperture located on a first upstanding arm of said U and a second coaxial aperture located on said second upstanding arm of said U, a central rod member rotatably positioned within said apertures, said rod extending from one side of said U and terminating in a socket member adapted to coact with said wheel lug, a lever arm coupled to said rod between said upstanding arms and adapted when pivoted to rotate said rod to impart a large torque to said socket member with said base of said U shaped member positioned at an angle on the ground to provide a support for the foot of a user when pivoting said lever arm to enable said user to apply his body weight to said base when accessing said lever arm.

BRIEF DESCRIPTION OF THE FIGURES

FIG. 1 is a side plan view of apparatus for loosening vehicle wheel lugs according to this invention;

FIG. 2 is a front plan view of one embodiment of a wrench apparatus according to this invention;

FIG. 3 is a side plan view of the apparatus of FIG. 2; and

FIG. 4 is a partial front view of an alternate embodiment.

DETAILED DESCRIPTION OF THE INVENTION

Referring to FIG. 1, there is shown a typical vehicle wheel or tire 10. As is well known, a tire such as 10 may be associated with an automobile, truck or other type of vehicle. The tire 10 is mounted on the vehicle by means of conventional lugs 12 which are positioned peripherally within the rim 11.

The lugs 12 are conventionally emplaced upon the threaded shafts associated with a vehicle wheel and are tightened by the utilization of relatively large forces. It is, of course, known that after extensive use, the nut becomes more firmly engaged upon the stud and hence, is extremely difficult to remove.

As will be explained, in order to facilitate the removal of a lug as 12, there is shown a wrench support device 20 according to this invention. The device 20 consists of a U shaped base member 21. The base member 21 has a rotatable cross bar 22 which is coupled via a T connection to a large lever arm 24. The lever arm 24 is removably coupled via the T connection 25 to the rotatable cross bar 22. In this manner, a user can impart a large force on the lug which is to be removed.

The U shaped base member 21 serves a dual purpose. The user, in exerting a force in the direction of arrow 30 of FIG. 1, may grasp the lever arm 24 with one or two hands and place his foot on the base portion of the U while doing so. In this manner, a large torque is provided which enables the user to easily break or turn the lug and hence, aids in facilitating removal of the same. The lever arm 24, as will be explained, is typically about 36" long and approximately ⅝" in diameter and is fabricated from a strong structural material such as steel.

Referring to FIG. 2, there is shown a front view of the wrench assembly 20. As can be seen, the U shaped member 21 has a bottom base section 32 which rests upon the ground as shown in FIG. 1. The base section 32 is approximately 6" long and the entire member 21 may be fabricated from an integral steel U shaped member or may be formed as a composite structure.

The member 21 has two apertures as 33 and 34 coaxially located on the upstanding arms of the U structure. A central rod 22 is rotatably positioned within the apertures 33 and 34 and is surrounded by a first outer pipe section 36 which may be welded at both ends of aperture 34 to the base member 21.

The rotatable rod 22 is coupled to a conventional hex head socket 40, which socket is selected to accommodate the typical lug or nut associated with a vehicle wheel. The rod 22, as seen in FIG. 2, is directed through apertures 34 and 33. A portion of the rod as directed through aperture 33, is also surrounded by a short length of pipe 37 and is rotatably retained within aperture 33 by means of a locking nut 38.

Centrally located about rod 22 is a T shaped section 41. The T shaped section 41 constitutes a tubular section 42 which is rigidly coupled to rod 22. The lever arm 24 is removably inserted into section 42 by means of a screw thread or by a slip fit. A rubber covering member 43 surrounds the tubular section 42 at a suitable distance to enable a user to easily insert or remove the lever arm 24, as will be further explained.

FIG. 3 depicts a side view of the apparatus 20 shown in FIG. 2. The width W of the U shaped member is approximately 3/16", while the height H is approximately 16" and the U shaped member 21 may be fabricated from ¼" steel stock.

As can be seen from FIGS. 1 and 2, the U shaped member 21 is tilted at an angle when the hex head socket 40 is coupled to a lug 12 associated with a vehicle wheel 10. The operator, by emplacing one or two feet on the base 32, now provides a force in the direction of arrow 30, which serves to loosen the nut. The operator can then proceed to loosen each nut on the wheel assembly in the same manner as the U shaped base 20 is completely adjustable.

It is further seen that any nut can be completely removed from the wheel assembly using this apparatus. Hence, once the lug is loosened, the operator may then remove the lever 24 from the T section 42 and grasp the rubber covered projection 42 and rotate it in a direction to completely remove the nut from the wheel. It is, of course, understood that once the lever 24 is removed, one can easily rotate member 42 without interference and hence, completely remove the nut by a multiple rotation.

Referring to FIG. 4, there is shown a similar configuration as that depicted in FIG. 3 with the U shaped base member 21 in partial section. The same reference numerals have been retained to depict similar functioning parts.

In this embodiment, the rod 22 as directed through aperture 33 terminates in a socket configuration 50. Hence, a user can now emplace a conventional ratchet type wrench 51 within the aperture 50 and serve to rotate the hex socket 40 as coupled to rod 22 by conventional ratchet operation, thus completely removing the lug nut from the wheel.

It is understood that based on the above described operations, there is never any interference with the ground or the automobile in completely breaking and removing a lug nut from a vehicle tire.

As is understood, the rod 22 may be fabricated as two individual rods which are welded together after emplacement of the surrounding piping sections by a conventional weld as weld 55 shown in FIG. 2.

As should be clear, the unit 20 is extremely compact as the base member 21 is relatively flat and hence, can be easily stored in the trunk of the vehicle after the lever arm 24 is removed.

The unit is extremely simple to operate as there is no critical adjustment mechanisms or mechanical skill necessary to employ the unit. The units depicted in FIGS. 2 and 4 are each capable of removing a nut after overcoming the seating torque. The operation is extremely simple, while the mechanism provided is extremely reliable to use and fabricate. A user can completely remove or break the seating torque associated with a lug, while standing completely erect and hence, there is no particular strain imparted on the back muscles of a user, as would be present in prior art devices. The U shaped base frame, besides providing a foot support to enable greater torque, serves to stabilize the unit by the U shaped member digging into the ground and hence, providing a uniform support on uneven ground or ground covered with snow and so on.

It is, of course, understood that the sizes of the unit can be varied, if necessary, to accommodate any type of vehicle and hence, to accommodate various size automobile rims and so on. By aligning the hex socket member 40 with the lug, the U shaped frame is automatically positioned and adjusted due to the manner of coupling the same to the rotatable central rod 22.

It can thus be seen that the above wrench apparatus is designed to facilitate the removal of lugs from vehicle wheels and to provide an extremely high torque to fully unseat such a lug, while enabling an operator to access the rotable rod to completely remove the nut from the wheel stud.

It should thus be apparent to those skilled in the art that the invention has great utility and many alternate configurations and embodiments should become evident upon reading this specification and hence, all such modifications and alterations are deemed to fall within the spirit and scope of the invention as defined by the claims appended hereto.

We claim:

1. Apparatus for loosening and removing vehicle wheel lugs, comprising:

(a) a "U" shaped base member having a first aperture located on a first upstanding arm of said "U" and a second coaxial aperture located on said second upstanding arm of said "U", (b) a central rod member rotatably positioned within said apertures, said rod extending from one side of said "U" and terminating in a socket member adapted to coact with said wheel lug, (c) a lever arm coupled to said rod between said upstanding arms and adapted when pivoted to rotate said rod to impart a large torque to said socket member with said base of said "U" shaped member positioned at an angle on the ground to provide a support for the foot of a user when pivoting said lever arm to enable said user to apply his body weight to said base when accessing said lever arm.

2. The apparatus according to claim 1 further including a T connecting member rigidly secured to said central rod between said arms and having a projecting tubular section for selectively inserting therein said lever arm.

3. The apparatus according to claim 2 wherein said lever arm, when removed from said tubular member enables said user to rotate said rod via said tubular member to remove said lug from said wheel.

4. The apparatus according to claim 1 wherein said other end of said rod is terminated in a ratchet socket adapted to receive a ratchet wrench for removing said lug by a ratchet action.

5. The apparatus according to claim 1 wherein said central rod includes gripping means on said rod as located between said upstanding arms to enable rotation of said rod when said base of said "U" shaped member is positioned on the ground.

6. The apparatus according to claim 2 wherein said tubular projection of said "T" connecting member is surrounded by an elastomeric material.

7. The apparatus according to claim 1 wherein said "U" shaped base member is fabricated from steel.

8. The apparatus according to claim 1 wherein a portion of said central rod is surrounded by a tubular pipe rigidly secured to at least one of said arms for rotatably containing a portion of said central rod.

9. The apparatus according to claim 1 wherein said "U" shaped member is dimensioned so that it assumes a given angle when said base is positioned on the ground with said socket member coacting with a wheel lug.

10. The apparatus according to claim 1 wherein said socket member is a hex socket member adapted to coact with a conventional automobile wheel lug.

* * * * *